US007841929B2

(12) United States Patent
Spiegel et al.

(10) Patent No.: US 7,841,929 B2
(45) Date of Patent: Nov. 30, 2010

(54) RECREATION ROOM AND METHOD FOR CONTROLLING THE ATMOSPHERE IN THE ROOM

(75) Inventors: Volker Spiegel, Berlin (DE); Ulrich Fuchs, Berlin (DE)

(73) Assignee: Volker Spiegel, Berlin (DE)

( * ) Notice: Subject to any disclaimer, the term of this patent is extended or adjusted under 35 U.S.C. 154(b) by 1212 days.

(21) Appl. No.: 10/535,352

(22) PCT Filed: Dec. 2, 2003

(86) PCT No.: PCT/EP03/13599

§ 371 (c)(1),
(2), (4) Date: Nov. 22, 2005

(87) PCT Pub. No.: WO2004/025690

PCT Pub. Date: Mar. 25, 2004

(65) Prior Publication Data
US 2006/0199518 A1   Sep. 7, 2006

(30) Foreign Application Priority Data

Dec. 2, 2002   (DE) ................................ 102 57 155

(51) Int. Cl.
*A61L 9/00*   (2006.01)
(52) U.S. Cl. ...................................... 454/238
(58) Field of Classification Search .................. 454/238
See application file for complete search history.

(56) References Cited
U.S. PATENT DOCUMENTS 3,215,057 A   11/1965   Turek

| 5,101,819 A | 4/1992 | Lane |
| 5,799,652 A | 9/1998 | Kotliar |
| 5,860,857 A | 1/1999 | Wasastjerna et al. |
| 5,887,439 A * | 3/1999 | Kotliar ............................. 62/78 |
| 6,427,484 B1 * | 8/2002 | Choi et al. ..................... 62/640 |
| 2002/0035927 A1 * | 3/2002 | Kutt et al. ...................... 96/111 |

FOREIGN PATENT DOCUMENTS

| DE | 41 42 122 A1 | 6/1993 |
| DE | 694 17 929 T2 | 12/1999 |
| EP | 0 277 787 A2 | 8/1988 |
| EP | 0 363 553 A1 | 4/1990 |
| EP | 0 959 862 B2 | 1/2005 |
| GB | 2254447 | 10/1992 |
| JP | 10216455 | 8/1998 |
| WO | WO 97/03631 | 2/1997 |

* cited by examiner

*Primary Examiner*—Steven B McAllister
*Assistant Examiner*—Samantha A Miller
(74) *Attorney, Agent, or Firm*—Shannon V. McCue; Mark A. Watkins; Hahn Loeser & Parks LLP

(57) ABSTRACT

The invention concerns a method of adjusting a room air in a first room wherein the room air is supplemented continuously or at recurring intervals of time by nitrogen or a nitrogen-bearing, carbon dioxide-poor gas mixture in such a way that the proportion of oxygen in the room air is less than 20.9% by volume and the proportion of carbon dioxide of the room air is less than 1% by volume, wherein at the same time at least a slight overpressure in relation to an outside atmosphere surrounding the room is set in the room.

13 Claims, 6 Drawing Sheets

Fig. 6
a)
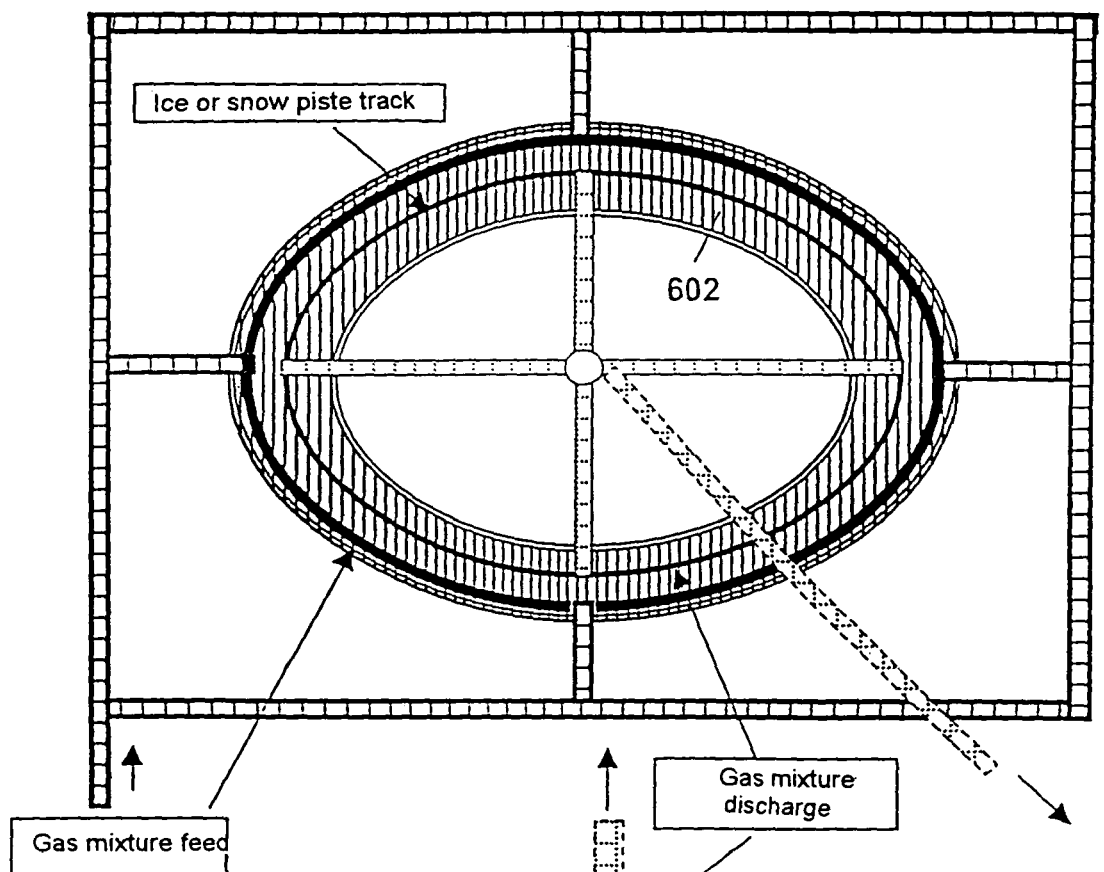
b)
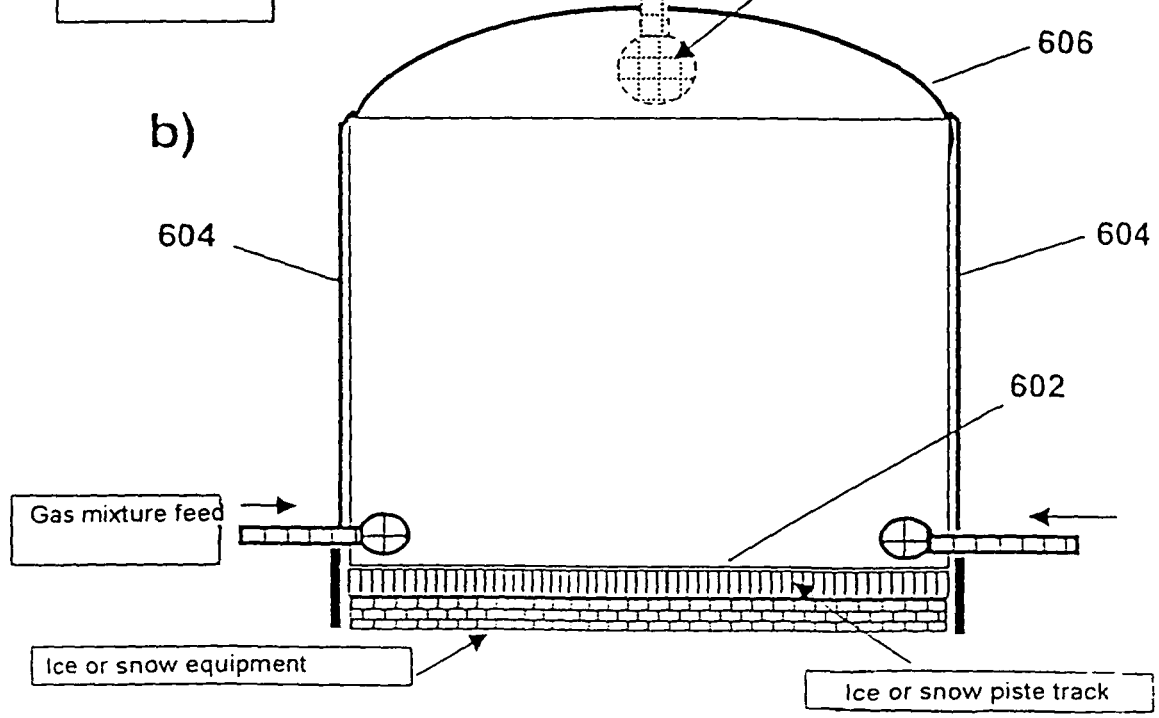

RECREATION ROOM AND METHOD FOR CONTROLLING THE ATMOSPHERE IN THE ROOM

TECHNICAL FIELD

The invention concerns a method of adjusting a room atmosphere in a recreation room in which the room air is supplemented continuously or at recurring intervals of time by nitrogen or a nitrogen-bearing, carbon dioxide-poor gas mixture, in such a way that the proportion of oxygen in the room air is less than 20.9%. The invention further concerns a recreation room for human beings or animals, in particular a sport training room which is filled with room air which has a lower oxygen partial pressure than an outside atmosphere surrounding the recreation room. Finally the invention concerns a room air installation for such a recreation room.

BACKGROUND OF THE INVENTION

In the present case the term recreation room is used to denote a room in which human beings or animals can stay. In particular the term recreation room is also used to mean a sport training room.

Sport training rooms whose room air involves an oxygen partial pressure which is reduced in comparison with an outside atmosphere surrounding the sport training room are basically known. Also known are methods for adjusting such a reduced oxygen partial pressure in the recreation room.

In the simplest case the total air pressure in the recreation room is reduced in relation to the outside atmosphere. In that way, the pressure conditions set in the recreation room are similar to those which also prevail at greater altitudes. In order to reduce the overall air pressure in the recreation room however, the recreation room has to be practically hermetically sealed off. That is very complicated and expensive. In the case of a sport training room the necessary air exchange is possible only at considerable cost.

Therefore for example EP 0 959 862 and EP 0 789 546 have proposed not reducing the overall pressure in the recreation room but reducing the oxygen partial pressure in the recreation room by increasing the nitrogen partial pressure. It has been found that the proposed methods overall involve a high level of operative complication and expenditure and are costly to implement.

SUMMARY OF THE INVENTION

Taking that state of the art as its basic starting point, the object of the present invention is to provide a method and a recreation room and a room air installation of the kind set forth in the opening part of this specification, which permit as inexpensive operation as possible of a recreation room whose room air has a reduced proportion of oxygen.

According to the invention, that object is attained by a method of the kind set forth in the opening part of this specification wherein at least a slight overpressure in relation to an outside atmosphere surrounding the recreation room is set in the recreation room. The proportion of carbon dioxide in the room air is set to a concentration initially below 0.04% by volume and then to a $CO_2$ concentration below established limit values, but at most between 1 and 0.65% by volume. The operation of adjusting the desired proportion of oxygen in the room air and the desired proportion of carbon dioxide is effected by regularly supplementing the room air, preferably in the room air circulatory mode.

The invention is based on the realisation that an only slight overpressure of for example between 10 and 100 hPa requires an only very moderately sealed-off room and has the result that any remaining leaks in respect of the recreation room cause continuous exchange of the room air in the recreation room, by virtue of the fact that room air escapes through the leaks and is replaced by processed ambient air from the outside atmosphere, which is fed to the room air.

Preferably the room air is operated in a circulatory mode and is supplemented in the circulatory mode by the nitrogen-bearing, carbon dioxide-poor gas mixture. Air exchange in respect of the room air in the recreation room, which is caused by that circulatory mode, is preferably so adjusted that a homogeneous atmosphere prevails in the recreation room.

The term nitrogen-bearing, carbon dioxide-poor gas mixture is used to denote a gas mixture which has a greater proportion of nitrogen in comparison with outside or ambient air.

The proportion of carbon dioxide in the room air is preferably adjusted by a proportion of the room air being replaced by carbon dioxide-poor air from the outside atmosphere, in the room air circulatory mode. In that case, the air of the outside atmosphere has a normal proportion of oxygen. The proportion of room air which is exchanged in the circulatory mode is so adjusted that the room air remains at a carbon dioxide concentration of initially less than 0.04% by volume and then a $CO_2$ concentration below established limit values, but is at most between 1 and 0.65% by volume.

Alternatively it is possible for the proportion of carbon dioxide in the air to be reduced chemically, in particular by means of special lime.

Preferably the room air which is passed in the circulatory mode is treated by regulated ionisation in such a way that the room air, with a low carbon dioxide content and a reduced oxygen content in relation to the outside atmosphere maintains a high air quality over a plurality of circulation cycles. In particular the proportion of hydrocarbons in the room air is reduced by the regulated ionisation. In that sense, the content of hydrocarbon and germs in the room air is considered as an essential criterion in respect of the air quality of the room air. Mixing of the gas mixture for supplementing the room air is preferably effected at an overpressure or a reduced pressure.

The mixing operation is preferably effected in a mixing chamber to which the components of the gas mixture which are to be mixed are fed in dependence on the desired composition of the gas mixture of the mixing chamber, under an overpressure or a reduced pressure. If mixing of the gas mixture is effected at an overpressure, the components are fed to the mixing chamber at different overpressures. If a reduced pressure prevails in the mixing chamber, the components of the gas mixture are fed to the mixing chamber at differing reduced pressures. Preferably the components of the gas mixture are on the one hand air from the outside atmosphere and on the other hand nitrogen.

A preferred method is one in which the nitrogen-bearing gas mixture is produced by air separation by means of a separation installation to which the room air is fed in the circulatory mode and in which in addition ambient air or nitrogen or a nitrogen-bearing gas mixture is added to the circulatory air in an amount which corresponds to an equivalent of the discharge air which occurs in the air separation operation, with an increased oxygen content. Such a method makes it possible to produce a room air involving a reduced oxygen partial pressure, using a separation installation.

When determining the equivalent of the discharge air with an increased oxygen content, which occurs in the air separation operation, it is to be borne in mind that the discharge air volume flow which is discharged from the separation installation, with an increased oxygen content, is not the sole discharge air volume flow. Rather, a multiple of the discharge air volume flow which is discharged from the separation installation, must be fed to the circulatory air in respect of fresh ambient air (fresh air volume flow) or also nitrogen-enriched gas mixture, so that this affords at least one second discharge air volume flow which is to be branched from the circulatory air volume flow and which, together with the discharge air volume flow discharged from the separation installation and the leakage volume flow, provides for a compensated volume balance.

A preferred method is also one in which the nitrogen-bearing gas mixture is produced by air separation from ambient air. The above-mentioned separation installation can be used for that purpose.

In connection with the last-mentioned method, an oxygen-enriched gas mixture which occurs upon air separation, with an oxygen proportion of more than 21% by volume, is added to a second room. Accordingly, the atmosphere prevailing in that second room is an atmosphere with an increased proportion of oxygen, which is desired for certain purposes, for example therapeutic treatment.

The room air with an increased oxygen content in the second room is preferably treated like the room air in the room with the reduced oxygen content.

Preferably at least one of the properties of the circulatory air such as air humidity, air temperature or the like is measured and adjusted in a regulation procedure.

In accordance with the invention the above-indicated object is also attained by a recreation room of the kind set forth in the opening part of this specification, in particular a sport training room, which is so adapted that at least for a short period of time it can hold at least a slight overpressure in relation to an outside atmosphere surrounding the recreation room. The recreation room is communicated by way of an air inlet opening and an air outlet opening with a room air installation which is adapted to adjust the room air in the recreation room in such a way that its oxygen partial pressure is lower than the oxygen partial pressure of the outside atmosphere.

In accordance with this invention the term recreation room which at least for a short period of time can hold at least a slight overpressure in relation to an outside atmosphere surrounding the recreation room is used to denote a recreation room which during operation is sufficiently sealed to ensure a leakage rate which is less than 10% and preferably below 5%. Here the term leakage rate is used to denote the ratio of a leakage volume flow to a total volume flow which is fed to the recreation room in operation. Besides the above-mentioned leakage volume flow the total volume flow issuing from the recreation room also includes a circulatory air volume flow. This is that proportion of room air which is deliberately and targetedly discharged from the recreation room in order to be re-processed in the circulatory air procedure.

Preferably provided in the recreation room are sensors for detecting the oxygen concentration or the oxygen partial pressure, the carbon dioxide concentration or the carbon dioxide partial pressure and the air humidity, air quality, ozone and air temperature.

A room air installation for attaining the above-mentioned object includes a circulatory air passage and at least one pump or blower for moving the circulatory air in the circulatory air passage. The circulatory air passage is to be communicated by way of inlet and outlet openings with a recreation room of the above-indicated kind. Connected into the circulatory air passage is a mixing chamber which has on the one hand an air inlet and an air outlet for the circulatory air and on the other hand an inlet for fresh air from the outside atmosphere and a nitrogen inlet for the feed of nitrogen into the mixing chamber.

The essential properties and advantages of the method according to the invention and the room air installation according to the invention are summarised hereinafter:
- the oxygen concentration, corresponding to a simulated altitude, in training and recreation rooms is controlled and regulated in accordance with the aim to be achieved to predetermined values with a close tolerance in close relationship with real time;
- intended changes in concentration can be effected effectively and quickly in respect of time;
- the carbon dioxide concentration in training and recreation rooms is to be held stable below established limit values but at least below 0.65% by volume;
- the amount by volume of gas mixture supplied can be flexibly adapted to the requirements involved;
- air quality is permanently maintained;
- the hypoxic atmosphere in the room is produced by way of the feed of two components—nitrogen (nitrogen content greater than 78% by volume, maximum 100% by volume) and fresh air (oxygen content 20.9% by volume)—which are produced separately or are taken from the outside air or also in part the room air itself and fed in a volume flow-controlled mode;
- the nitrogen is produced selectively by an industrially employed air separation installation (by means of different methods) on site in a variable amount (air separation installation with connected buffer) or is provided by way of tanks; the length of the nitrogen line between the air separation installation and the mixing chamber can be varied in such a way that no additional sound loadings occur in the region of the hypoxia room;
- the required composition of the gas mixture is produced prior to its being introduced into the room in a mixing chamber disposed upstream thereof (see FIG. 1);
- the separation production of the individual components nitrogen and fresh air and the regulated feed thereof by way of electronically controlled valves, by virtue of shutting down one component with a simultaneous increase in the volume flow of the other component, permits either a rapid rise in the equivalent altitude (reduction in the oxygen concentration in the room by solely supplying nitrogen) or a rapid reduction in the equivalent altitude (increasing the oxygen concentration by solely adding fresh air); in that way the period of time for producing the desired equivalent altitude can be shortened to a fraction in comparison with the feed of a constant gas mixture at the desired final concentration and the costs of producing the equivalent altitude also considerably fall. The equivalent altitude is the altitude above sea level at which respiration air is approximately at the same oxygen partial pressure as in the recreation room;
- the variable controllability of the partial volume flows and thereby the overall volume flow in respect of supplied hypoxia gas mixture out of the mixing chamber makes it possible to immediately increase the gas mixture volume flow and thus prevent a rise in the level of carbon dioxide concentration, upon an increase in the number of people in the room or upon an increase in intensity of physical strain;
- a microelectronic control and regulating system (for example DDC) makes it possible for the partial volume flows to be so regulated that disturbance influences are directly compensated and a constant oxygen concentration is guaranteed. The oxygen consumption of persons actively and passively present in the room is compensated by the corresponding addition of fresh air. Fresh air in-rushes due to people entering and leaving the room are compensatingly controlled by a reduction in the fresh air volume flow;

with an increase in the carbon dioxide concentration in the room above the established limit value the overall volume flow is automatically increased by way of an increase in both partial component volume flows. The increased volume flow causes an increased air change in the room and thereby also a reduction in the carbon dioxide concentration; the volume flow is increased until the carbon dioxide concentration is again below the predetermined limit values; and the intended air change (magnitude of the gas mixture volume flow) alone still does not ensure the desired air quality. That is achieved by a circulatory air system which is additionally installed in the hypoxia room and regulated ionisation in the circulatory air circuit assembly. In that system which passes the air in the hypoxia room by way of special filters and regulated ioniser and passes it back into the room, perspiration and other harmful substances (germs) are eliminated as a priority. Air change due to the inflowing gas mixture and the outflowing gas mixture serves predominantly to reducer the carbon dioxide concentration.

BRIEF DESCRIPTION OF THE DRAWINGS

The invention will now be described in greater detail with reference to the accompanying drawing in which:

FIG. 6 shows a hypoxic recreation room with an ice surface or snow piste track, more specifically FIG. 6a being a plan view on to an elliptical ice track and FIG. 6b being a cross-section through a tunnel for the elliptical ice track.

DETAILED DESCRIPTION OF THE INVENTION

Figure 1:
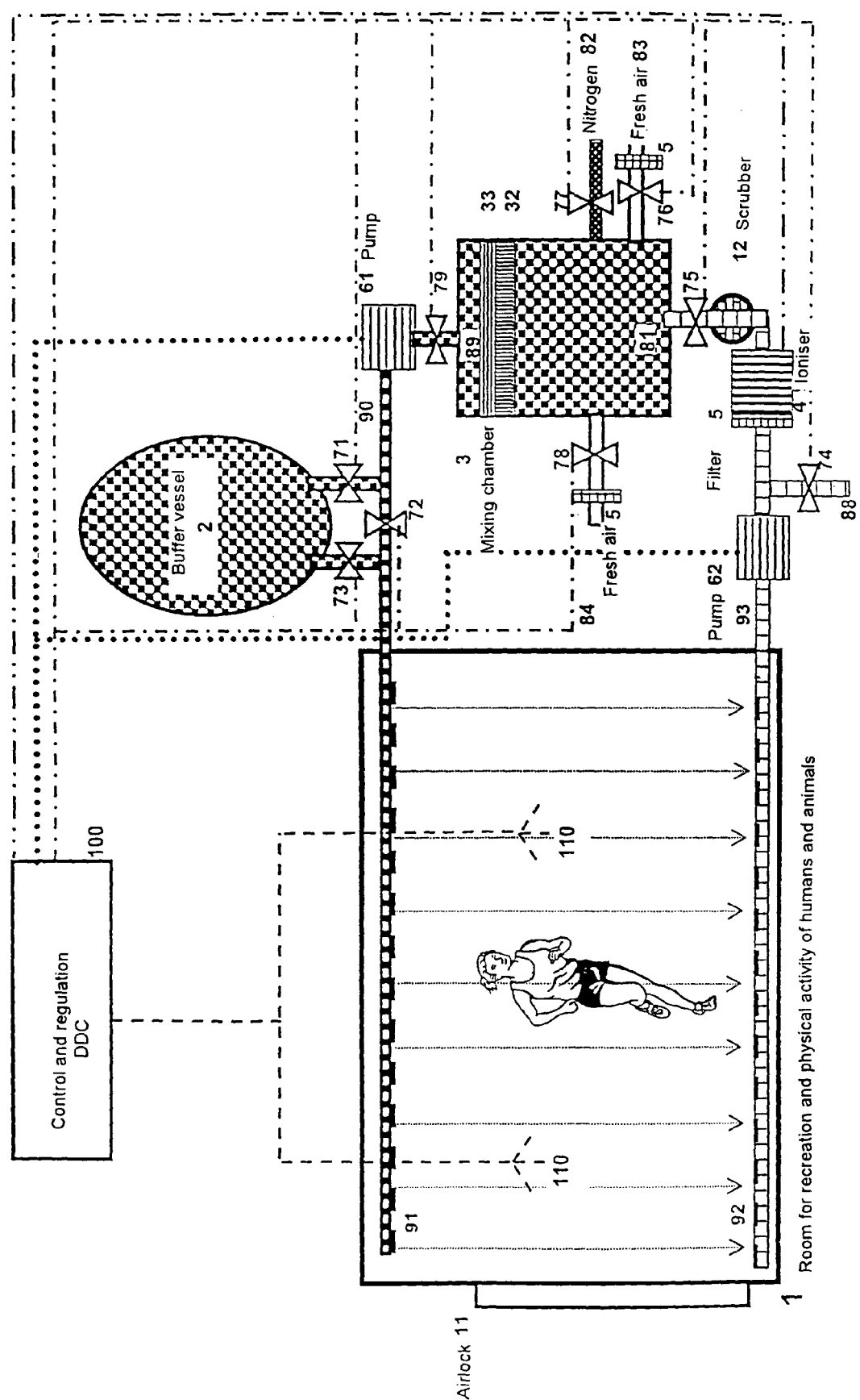
FIG. 1 shows a recreation room with a room air installation connected thereto for producing and regulating a hyperbaric hypoxic atmosphere in the recreation room.

The hypoxia installation shown in FIG. 1 includes the following component parts: a recreation room—hereinafter referred to as the room 1—for human beings and/or animals to stay and perform physical activities therein, a buffer container 2, a mixing chamber 3, an air moisture processing unit 32, a temperature processing unit 33, a regulated ioniser 4, a particle filter 5, a first pump 61, a second pump 62, electronically or otherwise regulatable through-flow valves (MFC or others) 71 to 79, an inlet for spent room air 81, an inlet 82 for nitrogen, a first inlet 83 for fresh air, a second inlet 84 for fresh air, an outlet 88 for spent room air, a mixing chamber outlet 89, a communicating line 90, a distributor 91 for freshly mixed room air, a receiver and delivery device 92 for spent room air, a second communicating line 93, a scrubber 12 for chemical elimination of carbon dioxide, a central unit 100 for electronic control and regulation (DDC or others) and sensors 110 for oxygen, carbon dioxide, water vapor, temperature, air pressure, air quality and ozone.

The terms room air and atmosphere are used hereinafter as synonyms and concern the air in the room 1 and the associated room air installation. A distinction is to be made in respect of the outside atmosphere which surrounds the room 1 and which is formed by fresh air.

Operation of the hypoxia installation shown in FIG. 1 is as follows:

The installation serves either for producing an oxygen-reduced (<20.9% by volume) and carbon dioxide-poor atmosphere (<0.04% by volume) in a closed or almost closed room 1 and/or regulation of an oxygen-reduced (<20.9% by volume) and carbon dioxide-poor atmosphere (<established limit value) in a closed or almost closed room when human beings and/or animals are in the room, with or without involving physical activity.

The production, described hereinafter, of an oxygen-reduced atmosphere is referred to as a passive mode of operation.

The production of an oxygen-reduced (<20.9% by volume) and carbon dioxide-poor atmosphere (<0.04% by volume) in the closed or almost closed room 1 is effected in a passive mode of operation as follows: by opening the valves 77, 79 and 72 nitrogen (% by volume $N_2$>78; $O_2$<20.9; $CO_2$<0.04; $H_2O$ towards 0) is passed into the closed or almost closed room 1 by way of the inlet 82 by means of the pump 61 or by the inherent pressure of the nitrogen if it is taken from a pressure vessel, by way of the communication 90 and special venting passages 91 which ensure uniform mixing of the nitrogen with the respective atmosphere in the room. By means of the pump 62 or by means of an increased pressure in the room 1, by way of regulated opening of the valve 71 when the valve 75 is closed, by way of special venting passages 92 which ensure that the freshly mixed room atmosphere is uniformly sucked away, only so much room atmosphere is discharged into the ambient atmosphere by way of the outlet 88 that an overpressure is maintained in the room. That process is maintained until the desired oxygen-reduced (<20.9% by volume) and carbon dioxide-poor atmosphere (<0.65% by volume) prevails in the room 1.

Regulation, supplemental to or alternatively to production, of an oxygen-reduced (<20.9% by volume) and carbon dioxide-poor atmosphere (<established limit value, for example 1% by volume or 0.65% by volume) in a closed or almost closed room 1, when human beings or animals are in the room and/or with physical activity, is effected in an active mode of operation either in a partly closed circulatory air system or in a closed circulatory air system.

The active mode of operation (regulation of the atmosphere) in a partly closed circulatory air system will first be described.

Regulation of an oxygen-reduced (<20.9% by volume) and carbon dioxide-poor atmosphere (<established limit value, for example 1% by volume or 0.65% by volume) in a closed or almost closed room 1 with the presence therein and/or with physical activity on the part of human beings or animals is effected in the active mode in a partly closed circulatory air system as follows: the circulatory air circuit arrangement is completely set in operation. The valve 75 is opened so that the atmosphere sucked out of the room 1 passes into the mixing chamber 3 by way of the inlet 81, through a particle filter 5 and a regulated ioniser 4 which removes all hydrocarbon-based pollutants from the atmosphere. A scrubber 12 which eliminates carbon dioxide from the atmosphere by chemical binding procedures can be selectively interposed into the air flow. Nitrogen, by way of the inlet 82, and ambient air, hereinafter referred to as fresh air, which passes a particle filter 5, by way of the inlet 83, are passed into the mixing chamber in a ratio by volume relative to each other which corresponds to that of the desired reduced oxygen concentration in the room 1. A further amount of fresh air is passed into the mixing chamber by way of the inlet 84, by way of a particle filter 5. That amount of fresh air is equal to the oxygen consumption of the human beings or animals in the room 1. It is in a given relationship to the intensity of movement of the human beings or animals in the room 1 and is established by way of the dynamics of oxygen consumption in the room 1 and automatically regulated. In that case the amount of oxygen contained in the amount of fresh air must be greater than the consumed amount of oxygen. The volume of nitrogen (inlet 82) and fresh air (inlets 83 and 84) corresponds in that respect to the sum of the amount by volume of consumed atmosphere which was previously discharged into the ambient atmosphere by way of the outlet 85 and the volume of the amount of consumed atmosphere which escapes from the circuit arrangement into the ambient atmosphere due to existing leaks continuously or due to disturbances such as people or animals passing into and out of the room through an air lock arrangement. The amount by volume which is discharged to the ambient atmosphere or which is freshly produced by mixing nitrogen and fresh air is established by way of the dynamics of the carbon dioxide concentration and the established levels of limit concentration of carbon dioxide in the room 1 and automatically regulated in such a way that an equilibrium condition (steady state) occurs or established limit values are not exceeded. The oxygen-reduced (<20.9% by volume) and carbon dioxide-poor atmosphere (<established limit value, for example 1% by volume or 0.65% by volume) produced in the mixing chamber, comprising processed spent atmosphere and fresh proportions of nitrogen and fresh air, is processed by air conditioning procedures prior to leaving the mixing chamber 3 in such a way that the desired temperature and air humidity occur in stable manner in the room 1. In addition further air conditioning of the atmosphere can take place in the room 1. From the mixing chamber, the processed atmosphere is passed into the closed or almost closed room through the outlet 89 and the valve 72 by means of the pump 62 or due to the inherent pressure of the processed atmosphere either by way of a buffer vessel 2 which can store the processed atmosphere or directly by way of the communicating line 90 and special ventilation passages 91 which ensure uniform mixing of the nitrogen with the respective atmosphere in the room. Regulated opening of the valves 74 and 75 provides that so much room atmosphere is discharged by way of the outlet 88 into the ambient atmosphere as is required to maintain the predetermined limit values in respect of the carbon dioxide concentration in the room 1 and maintaining an overpressure in the room, by means of the pump 62 or the present increased pressure in the room by way of special ventilation passages 92 which ensure uniform continuation of the spent room atmosphere. The spent room atmosphere which is reduced by the portion by volume which was discharged to the ambient atmosphere through the outlet 88 is passed into the mixing chamber by way of the particle filter 5 and the regulated ioniser 4 for renewed processing thereof. Optionally the remaining spent room atmosphere can be passed by way of a scrubber 12 for additionally eliminating carbon dioxide. The mixing operation in the mixing chamber 3 can take place under a slight overpressure, a great overpressure, or a reduced pressure. When mixing oxygen-reduced (<20.9% by volume) and carbon dioxide-poor atmosphere (established limit value, for example 1% by volume or 0.65% by volume) at a slight overpressure the components spent atmosphere, nitrogen and fresh air are passed into the mixing chamber at a pressure which is above the pressure of the atmosphere in the room 1 and the pressure of the freshly produced atmosphere is reduced by way of the valve 79 and the feed lines 90 and 91 so that the pressure prevailing in the room 1 remains constant. Upon mixing at a reduced pressure oxygen-reduced (<20.9% by volume) and carbon dioxide-poor atmosphere (<established limit value, for example 1% by volume or 0.65% by volume) is discontinuously produced and continuously passed by way of the buffer into the room 1. The pump 61 withdraws finished atmosphere from the mixing chamber by way of the valve 79 while the valves 75, 76, 77 and 78 are closed. By subsequent regulated opening of those valves, the components spent atmosphere, nitrogen and fresh air are passed into the mixing chamber in a regulated fashion, being differentiated in respect of time and quantity, and are processed to afford a new atmosphere. That procedure is repeated with closure of the valves 75, 76, 77 and 78. The pump 61 conveys the finished atmosphere into the buffer container by way of which regulated continuous discharge of that finished atmosphere is effected by way of the special ventilation passages 91. Upon mixing at a high overpressure oxygen-reduced (<20.9% by volume) and carbon dioxide-poor atmosphere (<established limit value, for example 1% by volume or 0.65% by volume) is discontinuously produced and passed into the room 1 continuously by way of the buffer. The components spent atmosphere, nitrogen and fresh air are passed into the mixing chamber in a differentiated manner in respect of time and quantity, by way of the inlets 81, 82, 83 and 84, at a high overpressure, while the valve 79 is closed. The valve 79 is opened after closure of the valves 75, 76, 77 and 78. That procedure is repeated with the closure of the valve 79. The pump 61 conveys the finished atmosphere into the buffer container, by way of which regulated continuous discharge of that atmosphere is effected by way of the special ventilation passages 91. The nature of the mixing operation—at a low overpressure, a high overpressure or a reduced pressure—influences the quality of the atmosphere produced and is determined in dependence on the desired composition of the atmosphere in the room 1, the required volume flow and the disturbing factors involved.

The active mode of operation for a closed circulatory air system will now be described.

Regulation of an oxygen-reduced (<20.9% by volume) and carbon dioxide-poor atmosphere (<established limit value, for example 1% by volume or 0.65% by volume) in a closed or almost closed room 1 in the presence of and/or with physical activity on the part of human beings or animals is effected in the active mode in a closed circulatory air system as follows: the circulatory air circuit arrangement is completely set in operation by means of the pumps 61 and 62. The valve 74 is closed and the valve 75 is opened so that the atmosphere which is sucked out of the room is passed out of the room 1 through a particle filter 5 and a regulated ioniser 4 which removes all hydrocarbon-based pollutants from the atmosphere, by way of the inlet 81 into the mixing chamber 3, the communicating line 90 and the special ventilation passages 91, back into the room 1. Optionally a scrubber 12 which eliminates carbon dioxide from the atmosphere by chemical binding effects can be interposed into the air flow. The closed system can be operated as long as limit values in respect of carbon dioxide concentration are not exceeded and the oxygen concentration does not go outside its normal ranges. Those conditions are afforded in the case of very large room volumes. After the limit values are reached either the atmosphere can be completely exchanged or the method is switched over to operation of a partly closed circulatory air system.

For all modes of operation, all hardware components are controlled by way of a central microelectronic control unit in the form of a DDC-installation and, by means of sensors for oxygen concentration, carbon dioxide concentration, water vapor concentration and pollutant concentration and for the volume flows spent atmosphere, nitrogen, fresh air and produced atmosphere as well as the temperature in the room 1 are regulated to the desired reference values.

Figure 2:
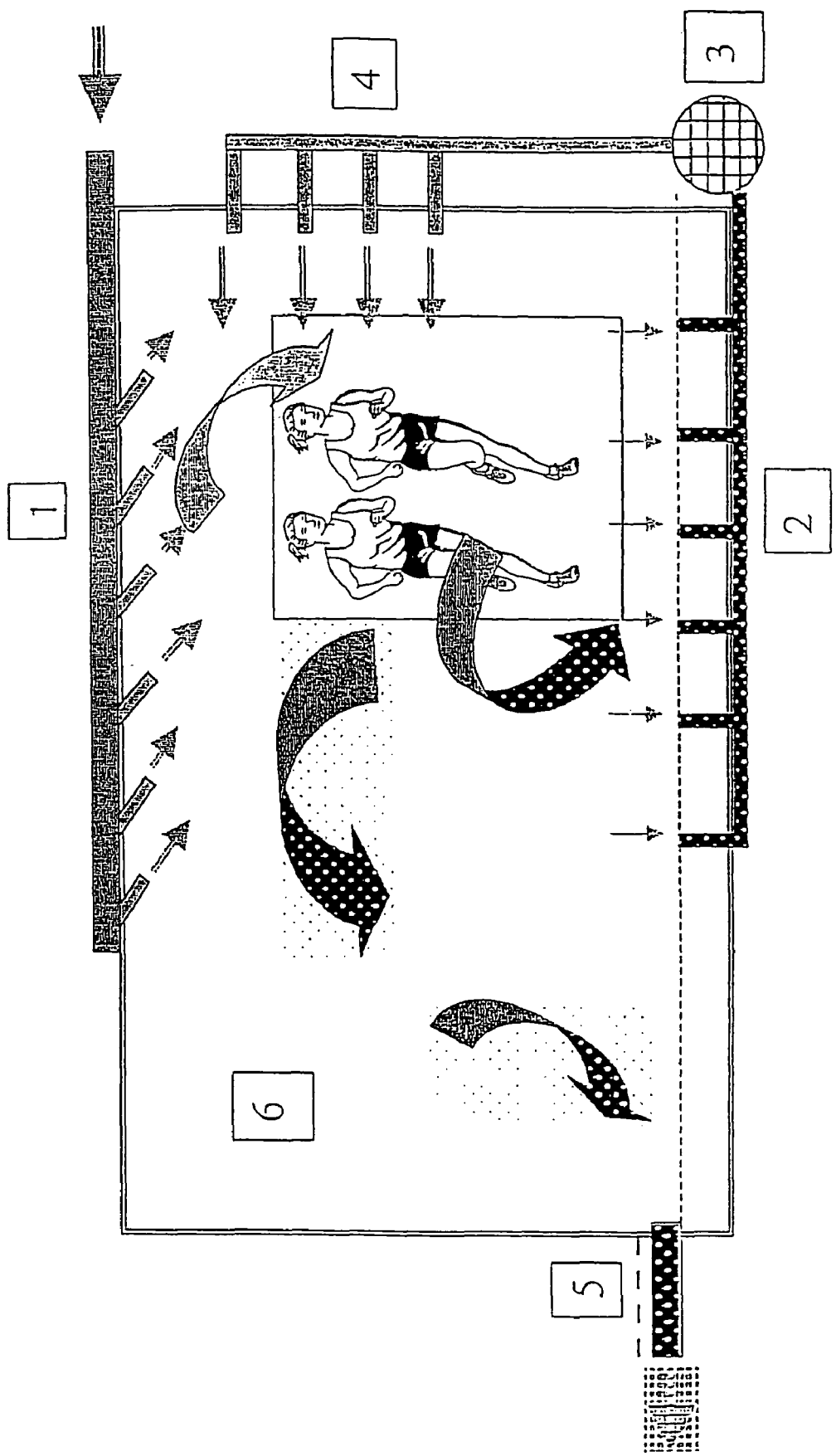
FIG. 2 shows a diagrammatic view in respect of the feed and discharge of the gas mixture into and out of the recreation room.

FIG. 2 shows aeration and ventilation of the room 1. The meanings of the reference numerals are as follows:

1—a gas mixture feed line with a variable volume flow and inclinedly forwardly directed outlet flow openings 2—suction removal near the floor of the circulatory air system 3—a pollutant elimination installation in the circulatory air system 4—discharge flow openings for the cleaned and carbon dioxide-enriched gas mixture 5—a suction removal line of controllably variable cross-section 6—the training or recreation room under hypoxia.

Positive control implementation is provided for the feed and discharge of the gas mixture. The amount of gas mixture which varies according to the requirements is blown under a slight increased pressure from the ceiling inclinedly downwardly (FIG. 2). After it has passed the persons who are training, it is sucked in by a circulatory air system which is near the floor and which cleanses the resulting mixed atmosphere of pollutants and is blown by the front and side walls for further use into the room in such a way that a rearwardly directed movement of air is produced. At the rear side of the room the same amount of air is actively sucked away at a slightly reduced pressure which corresponds to the overpressure when the air is blown in. The rolling movement of air through the room guarantees that the carbon dioxide-loaded gas mixture is transported away better than upon diffuse discharge through differently predetermined openings. Suction removal openings which flexibly adapt to the inflowing amount of gas mixture (cross-section) for the spent gas mixture permit continuing operation with different and changing numbers of people.

Figure 3:
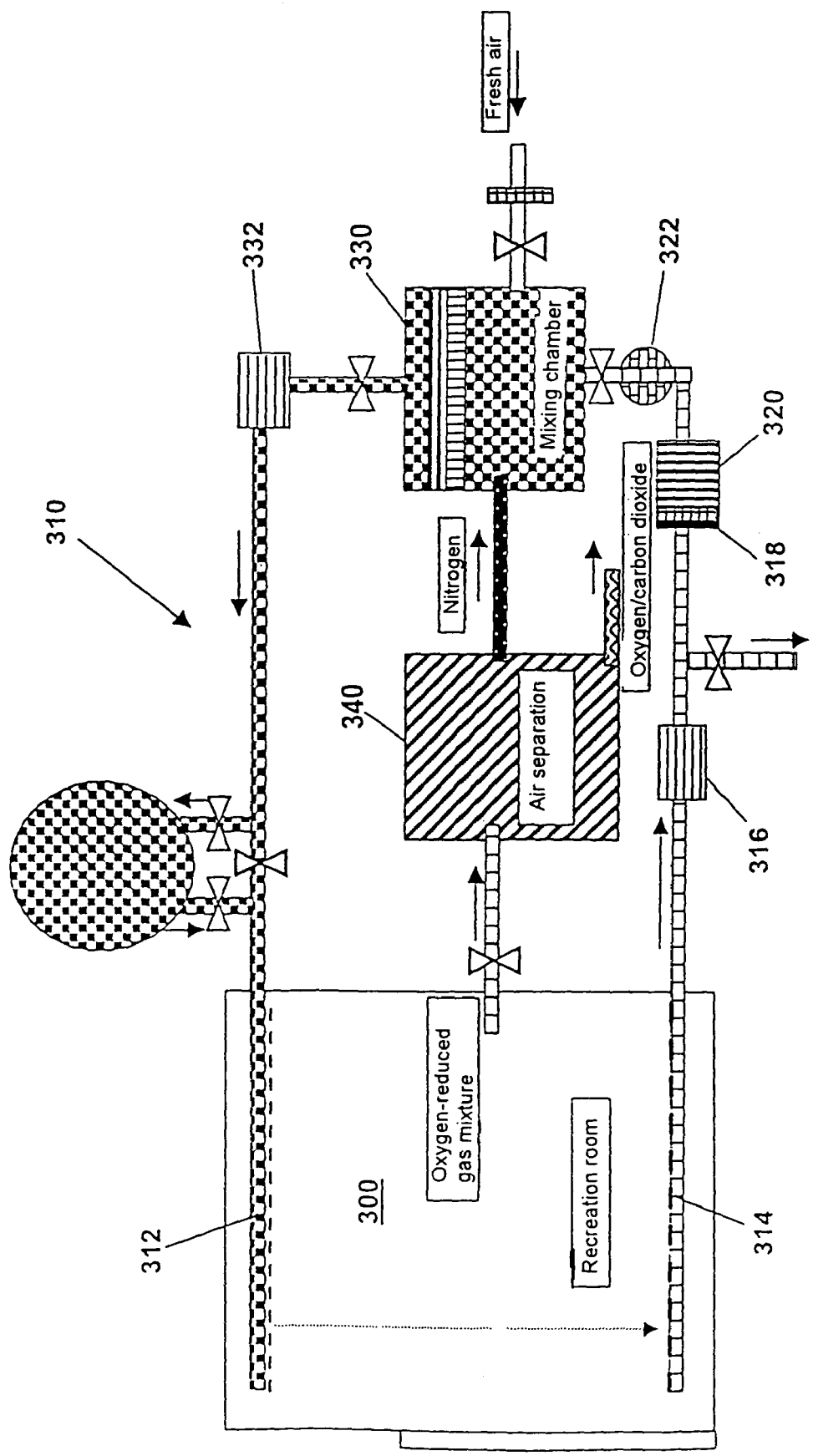
FIG. 3 shows a recreation room with an alternative room air installation connected thereto and which co-operates with an air separation unit for producing a nitrogen-bearing gas mixture.

The FIG. 3 arrangement of the recreation room 300 and the room air installation 310 differs in particular in respect of the room air installation 310 from the room air installation shown in FIG. 1. Common component parts are an air feed 312 and an air suction removal 314 in the recreation room 300. The room air which is discharged from the recreation room 300 is fed again by way of a pump 316, an ioniser 318 and filter 320, a scrubber 322, a mixing chamber 330 and a second pump 332 in a circulatory mode of operation to the air feed 312 in the recreation room 300. In that respect and also in respect of the valves and so forth which are not shown in greater detail here, the circulatory air installation shown in FIG. 3 does not differ from that of FIG. 1. The installations are also the same in regard to the fact that fresh air and nitrogen-bearing gas mixture or nitrogen is fed to the mixing passage 330. The same applies for a buffer container 334 for pressure equalisation which is possibly required. All valves are connected to a control and regulating system DDC which is shown in FIG. 1 and which is also connected to sensors in the recreation room 300.

The arrangement shown in FIG. 3 of the recreation room 300 and the circulatory air installation 310 differs from that shown in FIG. 1 however essentially in that there is provided an air separation unit 340 for producing the nitrogen or the nitrogen-bearing gas mixture which is fed to the mixing chamber 330. That air separation unit 340 is connected on the input side to the recreation room 300 by way of a line 342 in such a way that the separation unit 340 receives room air from the recreation room 300, separates that air into a nitrogen-enriched proportion and an oxygen and carbon dioxide-enriched proportion and feeds the nitrogen-enriched proportion of the gas to the mixing chamber 330. The nitrogen-enriched component produced by the air separation unit 340 can in that case also be approximately pure nitrogen which was obtained by air separation of the room air from the recreation room 300. The nitrogen-enriched gas component which is fed by the separation unit 340 to the mixing chamber 330 is mixed with fresh air in the mixing chamber 330 in the same manner as is the case in the room air installation shown in FIG. 1.

The fact that the air fed to the air separation unit 340 is the room air from the recreation room 300 has the advantage that this room air already has an increased proportion of nitrogen and that in addition, upon air separation in the air separation unit 340, at least a part of the carbon dioxide to be removed from the room air in the recreation room 300, is separated off and passed outwardly.

Figure 4:
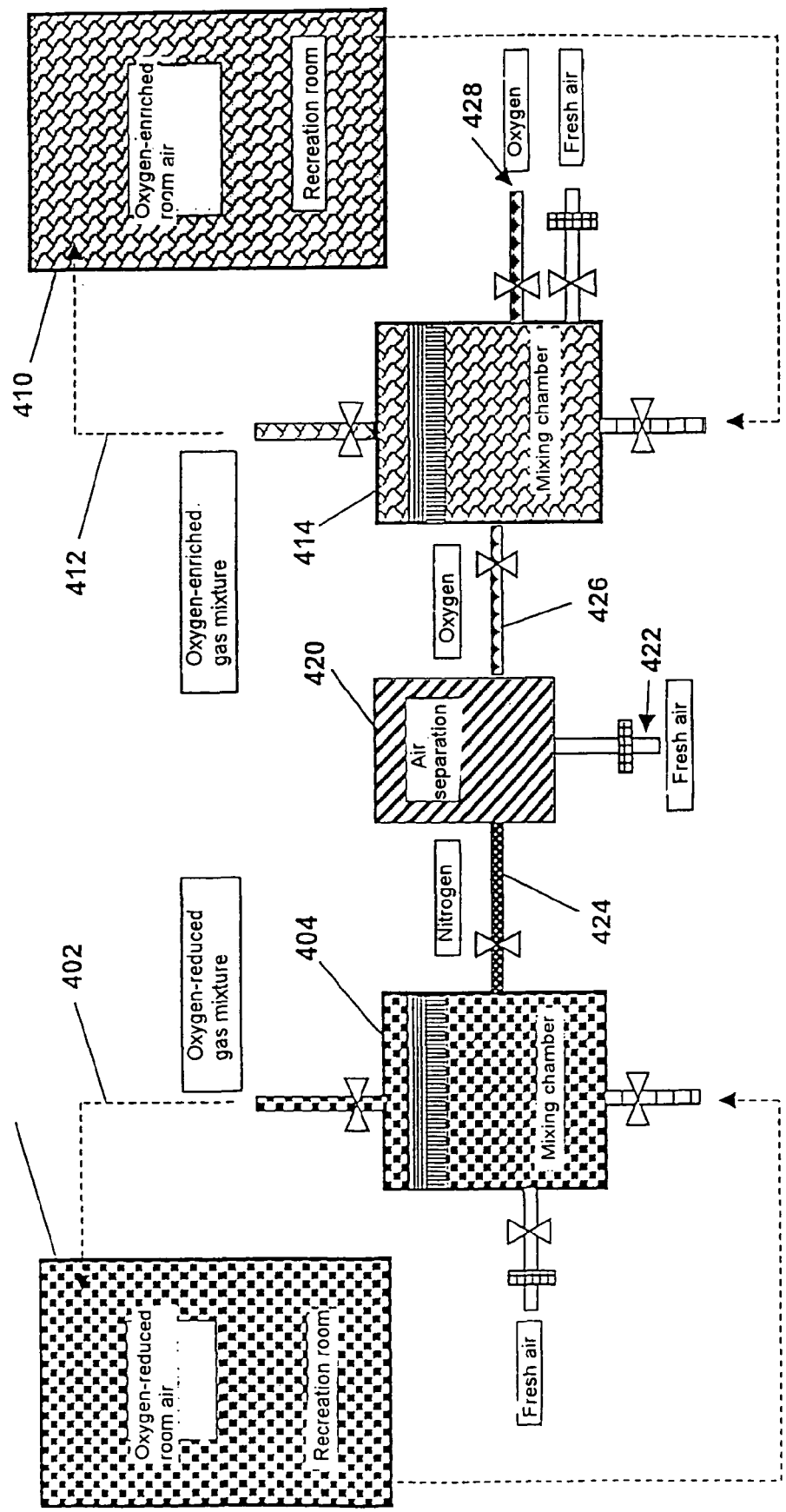
FIG. 4 shows an arrangement of two recreation rooms which are communicated with a room air installation and a common separation unit in such a way that one recreation room contains oxygen-reduced room air and the other recreation room contains oxygen-enriched room air.

The arrangement shown in FIG. 4 with two recreation rooms, namely a first recreation room 400 with oxygen-reduced room air and a second recreation room 410 with oxygen-enriched room air can correspond in respect of many details in relation to the circulatory air installation, associated with a respective recreation room 400 or 410, of the assembly shown in FIG. 3. An essential component part of a circulatory air circuit arrangement 402 for the recreation room 400 and a second circulatory air circuit arrangement 412 for the recreation room 410 is a respective mixing chamber 404 and 414 respectively. Both mixing chambers 404 and 414 are fed from an air separation unit 420. That air separation unit 420 is not connected at the input side to one of the recreation rooms but is supplied with fresh air (inlet 422). The nitrogen-enriched gas mixture which occurs in the air separation procedure is fed by way of a line 424 to the mixing chamber 404 for the first recreation room 400 with oxygen-reduced room air. The oxygen-enriched gas mixture which is also produced in the air separation procedure is fed by way of a line 426 to the second mixing chamber 414 for the circulatory air circuit arrangement 412 of the second recreation room 410 with oxygen-enriched room air.

In this case, the configuration of the room air installation for the first recreation room 400 with oxygen-reduced room air can precisely correspond to the room air installation shown in FIGS. 1 and 3.

With regard to the room air installation for the second recreation room 410 with oxygen-enriched room air, there is a difference in relation to the mixing chamber 414, namely that the mixing chamber, instead of a single inlet for oxygen-enriched gas mixture which would correspond to the inlet for oxygen-enriched gas mixture in FIGS. 1 and 3, also has a further inlet 428 for oxygen or oxygen-enriched gas mixture.

Figure 5:
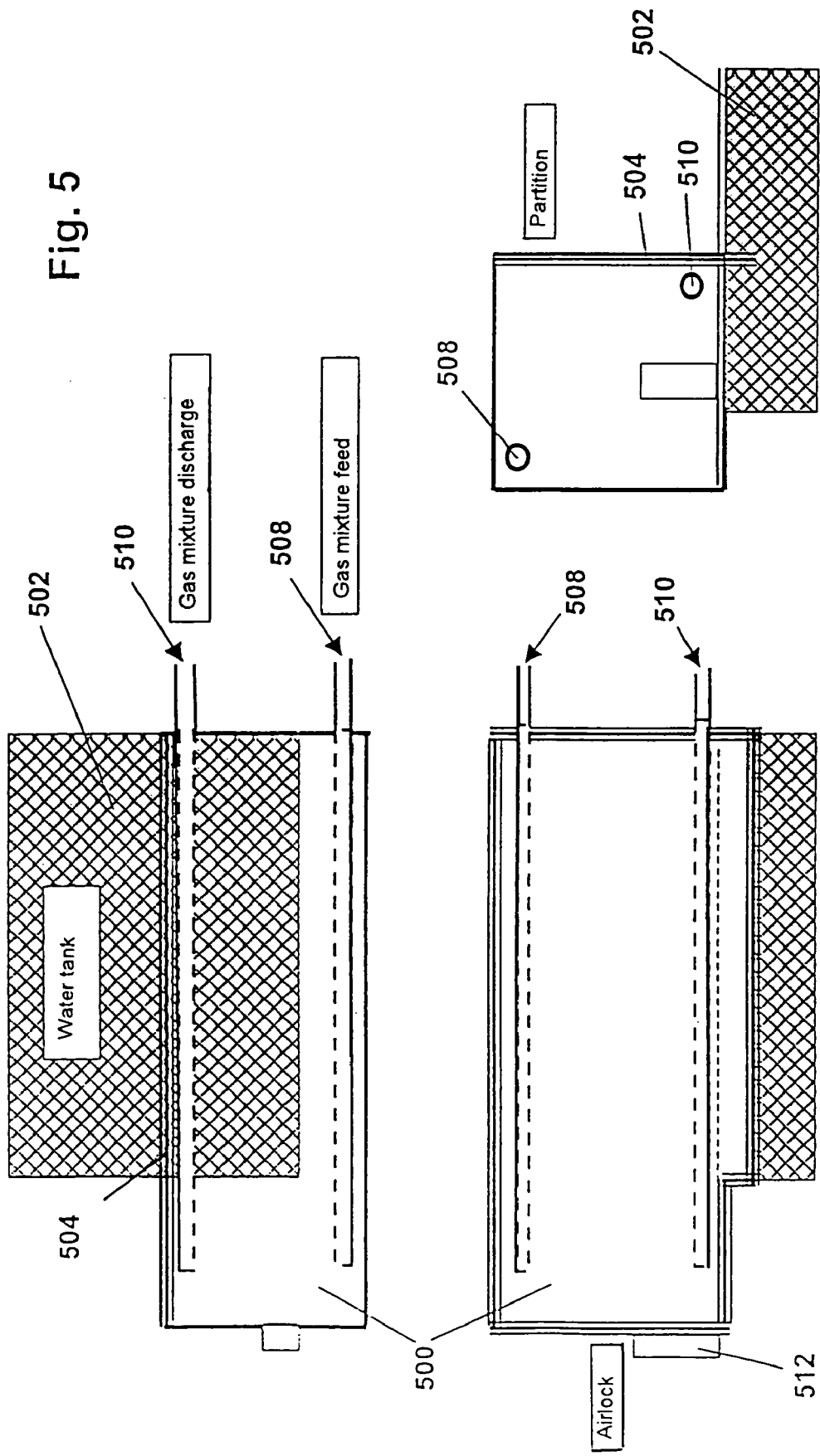
FIG. 5 shows three roughly diagrammatic views of a recreation room with reduced oxygen content and water tank.

FIG. 5 shows a particular variant of a recreation room 500 with oxygen-reduced or oxygen-enriched atmosphere. The particularity of the recreation room 500 is that it has a partition or separating wall 504 which extends into a water tank 502 and which ends below a water level 506 and which allows the water tank also to extend outside the recreation room 500, for example in an adjoining room or also in the free air. Satisfactory sealing of the recreation room 500 with respect to the ambient atmosphere is afforded by the water tank 502 and the partition 504 which projects thereinto. That allows swimmers to dive through the water tank into the recreation room and out of same.

As already shown in relation to the recreation rooms in FIGS. 1 and 3, in each case there are provided a feed line 508 and a discharge line 510 for the feed of oxygen-enriched or oxygen-reduced room air and for the discharge of the room air.

An entry air lock arrangement 512 allows dry access to the recreation room 500 without major air exchange between the room air in the recreation room 500 and the ambient air.

Finally FIG. 6 shows a recreation room 600 with an ice surface or a snow piste track 602. Just by way of example, the ice or snow piste track 602 is shown in the form of an elliptical track, over which the recreation room 600 with oxygen-reduced or oxygen-enriched room air is delimited by suitable room walls 604 and a ceiling 606. A particular feature of the recreation room 600 is that the feed of oxygen-reduced or oxygen-enriched gas mixture occurs in the proximity of the floor near the ice or snow piste track 602 through feed lines 610 extending along the ice or snow piste track 602. The gas mixture which is supplied through the feed lines 610 can be cooled in that case and can thus advantageously assist with maintaining the ice or snow piste track.

The gas mixture is preferably carried away by way of a discharge line 610 which extends in the region of the ceiling 606 of the recreation room 600 along the ice or snow piste track 602.

The invention claimed is:

1. A method of adjusting a room air in a first room comprising the steps of:
   adding to the room a nitrogen or a nitrogen-bearing, carbon dioxide-poor gas mixture until the proportion of oxygen in the room air is less than 20.9% by volume and the proportion of carbon dioxide of the room air is less than 1% by volume,
   producing the nitrogen-bearing gas mixture by separation of at least some of the room air withdrawn from the room in a separation installation in a circulatory mode and wherein ambient air or nitrogen or a nitrogen-bearing gas mixture is mixed with the room air in the separation; and
   during the step of adding, maintaining at least a slight overpressure in the room in relation to an outside atmosphere surrounding the room.

2. The method of claim 1 further comprising the step of removing air from the room for reconditioning such that the room air is passed in a circulatory air mode.

3. The method of claim 2, wherein a room air exchange caused by the circulatory air mode in the recreation room is so adjusted that a homogeneous atmosphere prevails in the recreation room.

4. The method of claim 2, wherein a proportion of carbon dioxide of the room air is replaced in the circulatory air mode by replacement of a proportion of the room air by carbon dioxide-poor air of the outside atmosphere with a normal proportion of oxygen, wherein the proportion of the room air exchanged in the circulatory air mode is so adjusted that the room air maintains a concentration of carbon dioxide below fixed limit values of up to 0.65% by volume.

5. The method of claim 2, further comprising the step of chemically reducing the proportion of carbon dioxide in the circulatory air.

6. The method of claim 2, further comprising the step of treating the room air which is passed in the circulatory air mode as required by regulated ionisation in such a way that the room air with a low carbon dioxide content and a reduced proportion of oxygen in relation to the outside atmosphere maintains an air quality which does not differ substantially from the quality of the outside atmosphere over a plurality of circulatory an cycles.

7. The method of claim 1 further comprising the step of supplementing the room air by mixing the room air with the gas mixture at an overpressure or a reduced pressure.

8. The method of claim 7 wherein the step of supplementing the room air by mixing the room air with the gas mixture is performed in a mixing chamber to which the components of the gas mixture to be mixed are fed at an increased pressure or a reduced pressure in dependence on the desired gas mixture of the mixing chamber.

9. The method of claim 7, wherein the gas mixture is mixed from air of the outside atmosphere and nitrogen.

10. The method of claim 2, further comprising the step of measuring and adjusting at least one of the properties of the circulatory air such as air humidity, air temperature or the like in a regulated fashion.

11. The method of claim 1, wherein the nitrogen-bearing gas mixture is produced by air separation of ambient air.

12. The method of claim 11, wherein an oxygen-enriched gas mixture having a proportion of oxygen of more than 21% by volume is produced in the air separation operation and is added to a second room so that the room air in the second room has an oxygen content which is increased in relation to the ambient air.

13. The method of claim 12, wherein the room air with the increased oxygen content in the second room is treated as set forth in one of claims 1 to 10.

* * * * *